United States Patent
Rados et al.

(10) Patent No.: US 9,548,993 B2
(45) Date of Patent: Jan. 17, 2017

(54) AUTOMATED SECURITY GATEWAY

(71) Applicants: Verizon Patent and Licensing Inc., Arlington, VA (US); Cellco Partnership, Arlington, VA (US)

(72) Inventors: Steven R. Rados, Danville, CA (US); Lalit R. Kotecha, San Ramon, CA (US); Jyothi Keshavdas, Pleasanton, CA (US); Arda Aksu, Martinez, CA (US); Thomas W. Haynes, San Ramon, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 205 days.

(21) Appl. No.: 14/012,859

(22) Filed: Aug. 28, 2013

(65) Prior Publication Data

US 2015/0067816 A1 Mar. 5, 2015

(51) Int. Cl.
  *G06F 21/56* (2013.01)
  *H04L 29/06* (2006.01)
(52) U.S. Cl.
  CPC .................................. *H04L 63/20* (2013.01)
(58) Field of Classification Search
  USPC ........ 726/1, 3, 13, 22, 23, 11; 713/168, 171; 370/229, 252; 709/206
  See application file for complete search history.

(56) References Cited

U.S. PATENT DOCUMENTS

| | | | | |
|---|---|---|---|---|
| 7,295,516 | B1* | 11/2007 | Ye | H04L 47/10 370/232 |
| 7,325,185 | B1* | 1/2008 | Szor | G06F 21/55 713/188 |
| 7,594,272 | B1* | 9/2009 | Kennedy | H04L 63/1408 713/187 |
| 2005/0193429 | A1* | 9/2005 | Demopoulos | H04L 63/0254 726/23 |
| 2006/0047766 | A1* | 3/2006 | Spadea | H04L 51/12 709/206 |
| 2006/0072451 | A1* | 4/2006 | Ross | H04L 47/10 370/229 |
| 2006/0075500 | A1* | 4/2006 | Bertman | G06F 21/563 726/24 |

(Continued)

FOREIGN PATENT DOCUMENTS

WO  WO 2013/036269  * 11/2011

*Primary Examiner* — Joseph P Hirl
*Assistant Examiner* — Sayed Aresh Beheshti Shirazi (57) ABSTRACT

A security device may be configured to receive information regarding traffic that has been outputted by a particular user device; and compare the information regarding the traffic to security information. The security information may include device behavior information, traffic policy information, or device policy information. The security device may determine, based on the comparing, that a security threat exists with regard to the traffic; and take, based on determining that the security threat exists, remedial action with respect to the traffic. Taking the remedial action may include preventing the traffic from being forwarded to an intended destination associated with the traffic, providing an alert, regarding the security threat, to the particular user device, or providing an alert, regarding to the security threat, to another device.

20 Claims, 8 Drawing Sheets

(56) References Cited

U.S. PATENT DOCUMENTS

| | | | |
|---|---|---|---|
| 2006/0173978 A1* | 8/2006 | Palm | H04L 63/20 709/220 |
| 2006/0198313 A1* | 9/2006 | Kitamura | H04L 12/2602 |
| 2007/0064617 A1* | 3/2007 | Reves | H04L 63/1425 370/252 |
| 2009/0171760 A1* | 7/2009 | Aarnio | G06Q 30/02 705/14.66 |
| 2012/0096261 A1* | 4/2012 | Ko | H04L 63/0236 713/168 |
| 2012/0192251 A1* | 7/2012 | Faiman | G06F 21/51 726/3 |
| 2013/0061313 A1* | 3/2013 | Cullimore | H04L 63/0227 726/13 |
| 2013/0085914 A1* | 4/2013 | McPherson | H04L 61/1511 705/34 |
| 2013/0198065 A1* | 8/2013 | McPherson | H04L 61/1511 705/40 |
| 2013/0263257 A1* | 10/2013 | O'Reirdan | G06F 21/552 726/22 |
| 2013/0325991 A1* | 12/2013 | Chambers | H04L 51/12 709/206 |
| 2014/0007235 A1* | 1/2014 | Glenn | G06F 21/552 726/23 |
| 2014/0007236 A1* | 1/2014 | Krueger | G06F 21/552 726/23 |
| 2014/0109182 A1* | 4/2014 | Smith | H04L 63/1416 726/3 |
| 2014/0201532 A1* | 7/2014 | Toy | H04W 12/06 713/171 |
| 2014/0220934 A1* | 8/2014 | Zhang | H04W 48/02 455/410 |
| 2014/0281508 A1* | 9/2014 | Akhter | H04L 9/0833 713/162 |
| 2014/0282816 A1* | 9/2014 | Xie | H04L 63/0227 726/1 |
| 2015/0007314 A1* | 1/2015 | Vaughan | H04L 63/1441 726/23 |

* cited by examiner

AUTOMATED SECURITY GATEWAY

BACKGROUND

Networks, such as networks found in consumers' homes, may connect various different devices to other networks, such as the Internet. Such networks are often targets of malicious attacks, in which unauthorized devices may attempt to send traffic through the network, or connect to other devices in the network in an unauthorized or unsafe manner. As another example, devices may be hijacked to behave in unexpected or unauthorized ways. For instance, a personal computer may be infected with a virus or other malware, which may cause the personal computer to send a relatively large number of emails in a brief period of time. Additionally, as home automation devices with network connectivity (such as light switches, temperature sensors, power outlet monitors, etc.) proliferate the market, security risks may arise, in which unscrupulous or negligent manufacturers or vendors of such home automation devices may invade the privacy (or may otherwise compromise the security) of users' home networks.

DETAILED DESCRIPTION OF PREFERRED EMBODIMENTS

The following detailed description refers to the accompanying drawings. The same reference numbers in different drawings may identify the same or similar elements.

Figure 1A:
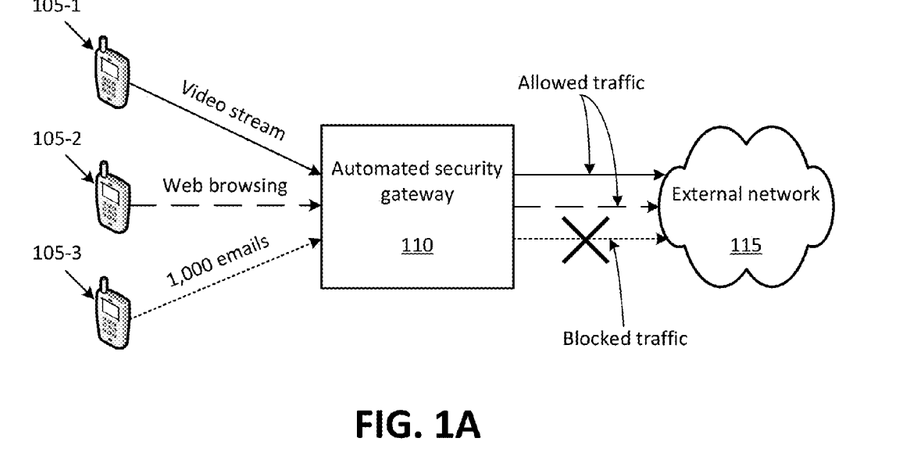
FIGS. 1A-1E illustrate an example overview of one or more implementations described herein.

Techniques described herein may allow for the detection and handling of potential security threats on a network. FIGS. 1A-1E illustrate examples of security threats that may be detected and potentially remedied, in accordance with some implementations. For instance, FIG. 1A illustrates three user devices 105-1 through 105-3 (hereinafter collectively referred to as "user devices 105," or individually as "user device 105"). User devices 105 may be associated with a network (e.g., connected to a router), and may be in communication with automated security gateway 110. Automated security gateway 110 may analyze traffic outputted by user devices 105 in order to identify potential security threats to the network. Automated security gateway 110 may allow or deny traffic, outputted by user devices 105, to be transmitted to network 115 (e.g., the Internet). Automated security gateway 110 may, in some implementations, be configured by a service provider (e.g., an Internet service provider), an administrator associated with the network, a user of user device 105, and/or another user or device. By allowing service provider configuration of automated security gateway 110, service provider may gain enhanced levels of control over preventing potential security threats from affecting the service provider's network.

For example, as shown in FIG. 1A, automated security gateway 110 may identify that user device 105-1 is currently outputting traffic that corresponds to a video stream, and that user device 105-2 is currently outputting traffic that corresponds to a web browsing session. As indicated by the illustrated connections between automated security gateway 110 and network 115, automated security gateway 110 may determine that the traffic outputted by user devices 105-1 and 105-2 is not a security threat, and may allow the traffic to be transmitted to network 115. On the other hand, as further shown in FIG. 1A, automated security gateway 110 may detect that user device 105-3 is attempting to output a relatively large number of emails in a brief period of time (e.g., 1,000 emails in 15 minutes). Automated security gateway 110 may identify that this traffic is a potential security threat, and may take remedial measures. For example, as indicated by the crossed out line between automated security gateway 110 and network 115, automated security gateway 110 may block some or all of the email requests (and/or other traffic from user device 105-3) from being outputted to network 115. In some implementations, automated security gateway 110 may additionally, or alternatively, generate an alert indicating that this traffic was blocked.

Figure 1B:
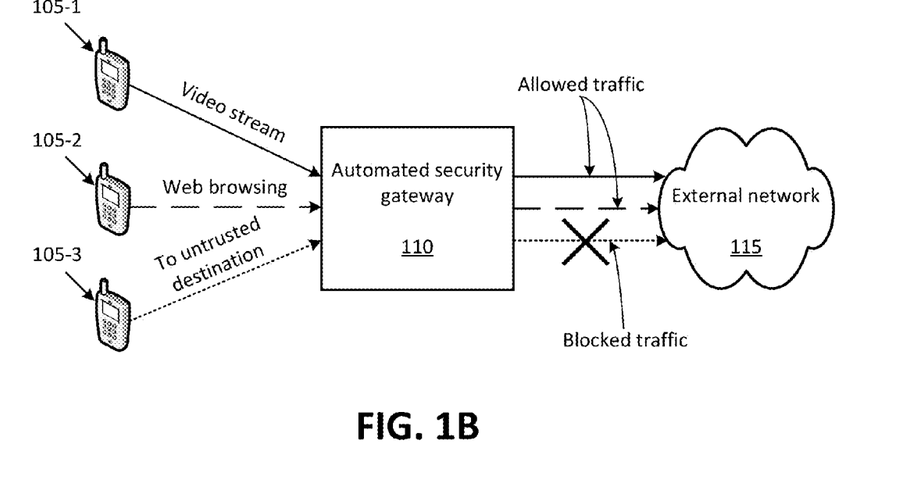

As another example, as shown in FIG. 1B, automated security gateway 110 may detect that user device 105-3 is attempting to output traffic to an untrusted destination. For instance, this traffic may correspond to a hypertext transfer protocol ("HTTP") request to access a known untrusted or unsafe web page (e.g., a "phishing" web page).

Figure 1C:
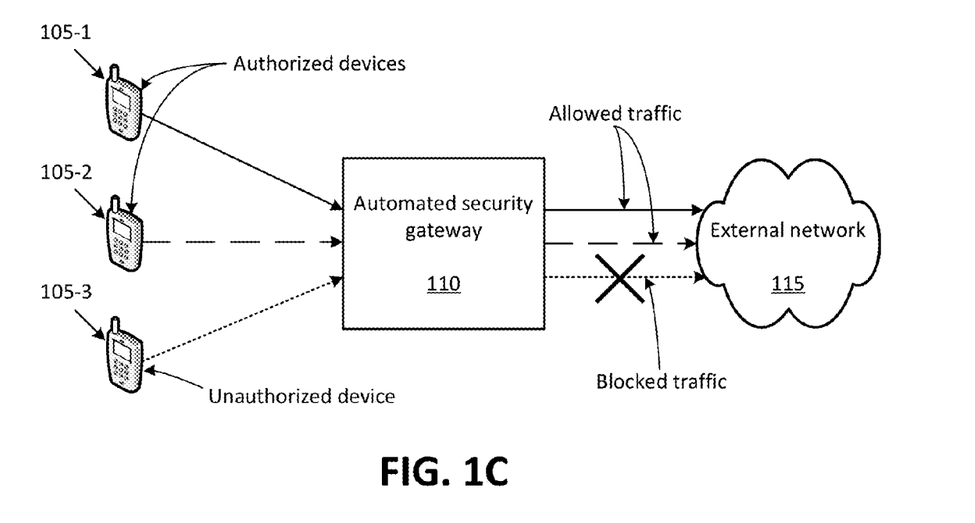

In some implementations, automated security gateway 110 may store information identifying authorized or recognized devices. As shown in FIG. 1C, automated security gateway 110 may detect that user device 105-3 is not an authorized or recognized device, and may therefore prevent traffic, outputted from user device 105-3, to network 115.

Figure 1D:
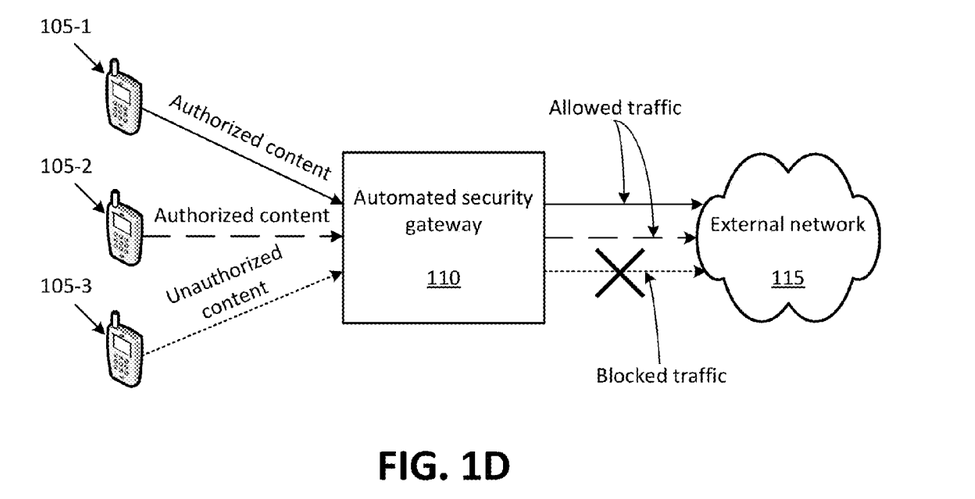

In some implementations, automated security gateway 110 may store information indicating types of traffic that are permitted for certain devices or classes of devices. For instance, this information may indicate certain protocols that are permitted to be outputted by particular devices, and/or the content of messages that are permitted to be outputted by particular devices. For example, camera devices may only be permitted to output video content. As shown in FIG. 1D, automated security gateway 110 may detect that the traffic outputted by user device 105-3 is not of a type that is authorized for user device 105-3. In this situation, home automation devices, which are attempting to output information that is not intended or expected, may be blocked from doing so. Such home automation devices may have been compromised by a security risk (e.g., infected with malware), or may have been designed or sold by an unscrupulous or malevolent manufacturer or vendor.

Figure 1E:
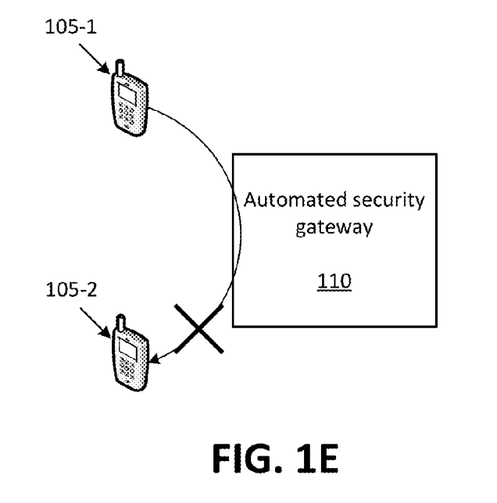

In some implementations, automated security gateway 110 may restrict certain devices from communicating with other devices (e.g., other devices on the same network). For instance, automated security gateway 110 may store information indicating that user device 105-1 is not permitted to output traffic to user device 105-2. As shown in FIG. 1E, automated security gateway 110 may detect that user device 105-1 is attempting to output traffic to 105-2, and may prevent this traffic from being sent to user device 105-2. For instance, it may be desirable for home automation devices to communicate with some devices on a network, while not being able to communicate with other devices on the network. For example, a user may desire to send commands to, and receive feedback from, a power outlet monitor on the user's home network. However, it may be undesirable or unnecessary for the power outlet monitor to send or receive traffic to other devices, such as a video camera device on the network.

In some implementations, the example security procedures described above with respect to automated security gateway 110 may be performed based on analyzing behavior of one or more user devices 105, and identifying potential security threats when traffic outputted by user devices 105 deviates significantly from the usual behavior. Further, in some implementations, automated security gateway 110 may generate reports regarding traffic analyzed by automated security gateway 110 and/or security threats identified by automated security gateway 110.

By analyzing network traffic and identifying potential security threats, some implementations may enhance network security, thus enhancing the experience of users of a network. Further, since security threats are potentially costly, detecting and remedying potential security threats, as described herein, may yield a large savings in expenses that would have been otherwise incurred as a result of such security threats. Further still, providing reports regarding network activity may provide users and/or network administrators a more granular mode of analyzing network traffic than has previously been available.

Figure 2:
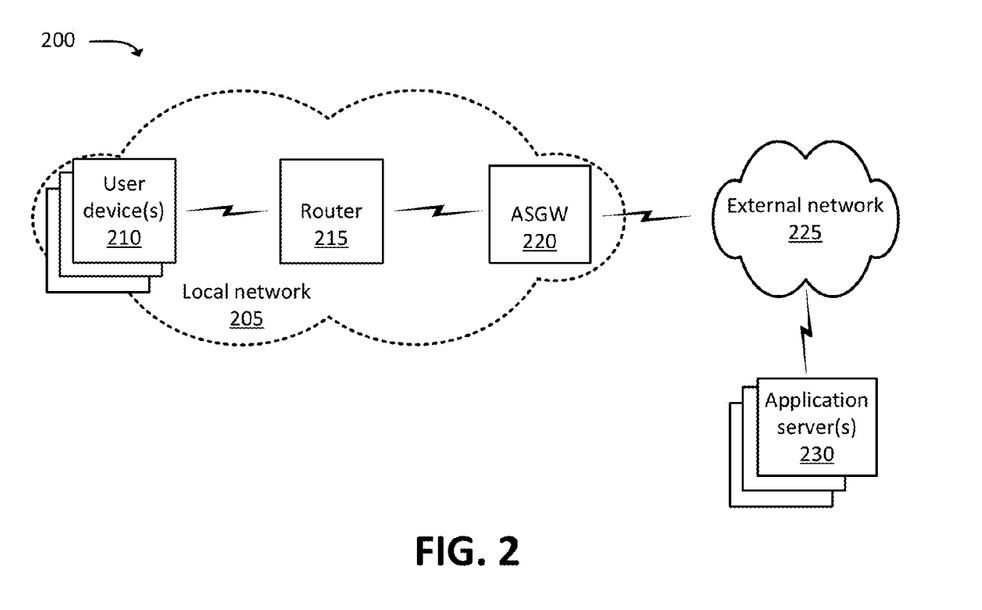
FIG. 2 illustrates an example environment in which systems and/or methods, described herein, may be implemented.

FIG. 2 illustrates an example environment 200, in which and/or methods described herein may be implemented. As shown in FIG. 2, environment 200 may include a local network 205, which may include one or more user devices (herein referred to collectively as "user devices 210," or individually as "user device 210"), router 215, and automated security gateway ("ASGW") 220. Devices in local network 205 may allow user devices 210 to communicate with one or more devices or networks that are external to local network 205 (e.g., to external network 225 and/or one or more application servers (herein referred to collectively as "application servers 230," or individually as "application server 230")).

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

In some implementations, local network 205 may correspond to, for example, a home network, via which a user's devices may connect to the Internet. Local network 205 may include a wired network and/or a wireless network. When local network 205 includes a wireless network, local network 205 may include one or more wireless access points, via which user devices 210 may communicate with router 215, other user devices 210, and/or other components of local network 205.

User device 210 may include any computation and/or communication device, such as a wireless mobile communication device that is capable of communicating with one or more networks (e.g., external network 225). For example, user device 210 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system; or another type of mobile computation and communication device. In some implementations, user device 210 may include a sensor device, such as a camera, a temperature sensor, a speed sensor, a door sensor, and/or another type of sensor. User device 210 may additionally, or alternatively, include a machine to machine ("M2M") device, which may communicate with other devices using M2M standards developed or approved by, for example, the International Telecommunication Union ("ITU"). User device 210 may, in some implementations, include a home automation device (or a device that is in communication with a home automation device), such as a thermostat, a garage door opener, a security monitoring system, and/or another type of home automation device.

Router 215 may include a computation and/or a communication device that forwards traffic between various devices and/or networks. For example, router 215 may forward traffic, from user devices 210 toward external network 220. Additionally, router 215 may forward traffic, from external network 220, toward user devices 210. Router 215 may, for instance, examine data packets (e.g., packet header information), in order to determine a destination for the data packets.

In some implementations, router 215 may output traffic, that is received from user device 210, to ASGW 220. As described further below, ASGW 220 may make determinations of whether to output traffic toward an intended destination (e.g., to external network 225), based on security policies enforced by ASGW 220.

External network 225 may include one or more wired and/or wireless networks. For example, network 225 may include a cellular network, a public land mobile network ("PLMN"), a second generation ("2G") network, a third generation ("3G") network, a fourth generation ("4G") network, a fifth generation ("5G") network, and/or another network. Additionally, or alternatively, external network 225 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks.

Application server 230 may include one or more computation and communication devices that receive and/or send traffic to user devices 210. For example, application server 230 may include a web server and/or another type of device, to which user device 210 may send traffic (e.g., via external network 225). In some implementations, application server 230 may be a server that provides configuration information for ASGW 220. In some such implementations, application server 230 may be maintained, owned, and/or operated by a service provider associated with external network 225.

Figure 3:
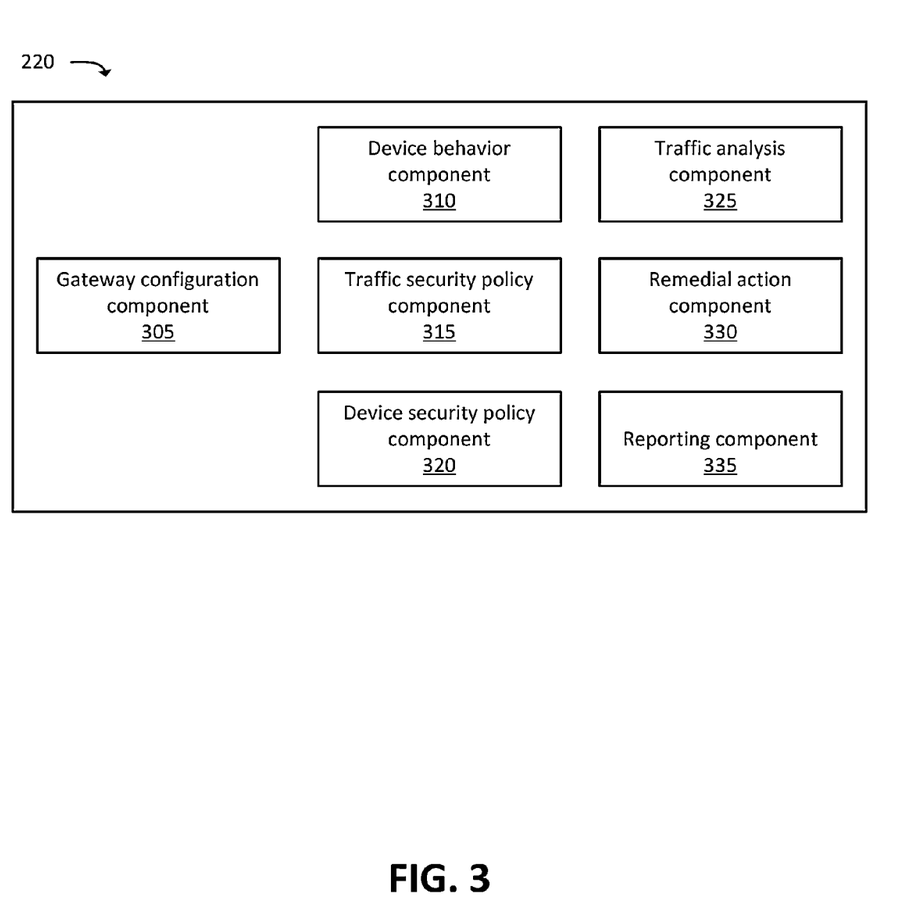
FIG. 3 illustrates example components of an automated security gateway in accordance with one or more implementations.

FIG. 3 illustrates example components of ASGW 220, according to some implementations. As shown, example ASGW 220 may include gateway configuration component 305, device behavior component 310, traffic security policy component 315, device security policy component 320, traffic analysis component 325, remedial action component 330, and reporting component 335. In other implementations, ASGW 220 may include additional, fewer, different, and/or differently arranged components than shown in the figure. Additionally, some or all of the functionality described below with respect to one particular component may be performed by one or more other components.

Gateway configuration component 305 may store configuration information for ASGW 220. This configuration information may be received from, for example, a user (e.g., an administrator associated with ASGW 220). In some implementations, some or all of the configuration information may be received from one or more devices that output configuration information (e.g., a web server that provides security policy information). In some such implementations, the configuration information may be received from a service provider, such as an Internet service provider associated with external network 225. The configuration information may be automatically received or retrieved by gateway configuration component 305 on a periodic basis (e.g., once a week, once a day, etc.), and/or on an otherwise intermittent basis (e.g., when network or processor resources are available). As described below, the configuration information may be used be to configure one or more other components of ASGW 220.

Device behavior component 310 may store information regarding the behavior of one or more user devices 210. For instance, device behavior component 310 may store information regarding types of traffic outputted by user devices 210 (e.g., HTTP requests, email requests, video streaming data, file transfer data, and/or any other type of traffic). The behavior information may additionally, or alternatively, include information identifying amounts of traffic outputted and/or requested by user devices 210. The behavior information may, in some implementations, include other types of information, which may be useful in identifying trends associated with traffic outputted to and/or requested by user devices 210 (e.g., time of day information, intended destinations of traffic, and/or other information). In this sense, device behavior component 310 may be able to determine, for each user device 210, a "baseline" behavior, which may be useful in determining when traffic outputted from user device 210 potentially poses a security threat, due to a deviation from the baseline behavior.

Device behavior component 310 may receive or generate behavior information based on analyzing traffic outputted by user devices 210. In some implementations, device behavior component 310 may receive all of the traffic outputted by a particular user device 210. In other implementations, device behavior component 310 may receive portions of the traffic outputted by a particular user device 210 (e.g., header information of all packets outputted by user device 210, header information of some packets outputted by user device 210, payload information of some packets outputted by user device 210, etc.). Device behavior component 310 may receive the traffic (or the information regarding the traffic) from user device 210 and/or from one or more other devices (e.g., router 215 or another device that receives or monitors traffic outputted by user devices 210).

While device behavior component 310 is illustrated as a component of ASGW 220, in some implementations, one or more external devices may perform some or all of the functionality of device behavior component 310. For instance, application server 230 may receive information regarding traffic sent to and/or from user devices 210, and may analyze the traffic in order to determine the behavior or user devices 210. In some implementations, ASGW 220, application server 230, and/or one or more other devices may each analyze traffic in order to determine the behavior of user devices 210.

In some implementations, users of user devices 210 may opt in to a service, whereby the behavior of user devices 210 may be monitored by device behavior component 310. Users may, in some implementations, be provided the opportunity to opt out of such a service. Further, in some implementations, a particular user may be provided the opportunity to access and/or remove some or all of the stored behavior information that corresponds to a user device 210 that is associated with the particular user.

Traffic security policy component 315 may store information regarding trusted and/or untrusted traffic. For instance, traffic security policy information, stored by traffic security policy component 315, may indicate types and/or amounts of traffic that are regarded as trusted or untrusted. For instance, the traffic security policy information may indicate that greater than 100 emails, sent by the same user device 210 in a 10-minute timeframe, should be regarded as untrusted traffic. As another example, traffic security policy component 315 may store information indicating that a particular user device is allowed to send and/or receive only 10 gigabytes of data per month, and that any traffic in excess of the 10-gigabyte limit should be regarded as untrusted.

As yet another example, traffic security policy component 315 may store information indicating that a particular set of destinations should be considered as untrusted, and that traffic addressed to these destinations should be considered to be untrusted traffic. For instance, the traffic security policy information may indicate a set of "phishing" web sites, which may be intended to trick a user into believing that he or she is accessing a trusted web site (such as a web site associated with a bank or other financial institution), when he or she is actually accessing a different web site (which may be designed to illicitly obtain user names, passwords, account details, or other information).

In some implementations, the traffic security policy information may include information indicating types or content of messages that certain user devices 210 (or types of user devices 210) are permitted to send. For example, assume that a particular user device 210 corresponds to a temperature sensor. The traffic security policy information may indicate on certain protocols for messages that the temperature sensor is permitted to output, or messages that the temperature sensor is permitted to output (e.g., messages of which the content relates to temperature readings).

As another example, traffic security policy component 315 may store traffic security policy information that indicates permissible or non-permissible inter-device communications. For instance, traffic security policy component 315 may store information indicating that a particular user device 210 may not send traffic to another user device 210 located in local network 205. In some implementations, traffic security policy component 315 may store information indicating that a particular user device 210 may send traffic to another user device 210 located in local network 205. As another example, traffic security policy component 315 may store information indicating that no inter-device communications within local network 205 are permissible, that all inter-device communications within local network 205 are permissible, that no inter-device communications within local network 205 from a particular user device 210 are permissible, that all inter-device communications within local network 205 from a particular user device 210 are permissible, etc.

As yet another example, traffic security policy component 315 may store traffic security policy information indicating a maximum amount of bandwidth that is permitted to be consumed (e.g., upload bandwidth, download bandwidth, or combined bandwidth) by a particular user device 210. For instance, a parent may desire to restrict the amount of data that a child's laptop computer uploads and/or downloads in a particular week.

In some implementations, traffic security policy information may be stored on a per-user device 210 basis. In some implementations, traffic security policy information may be stored on a per-type basis (e.g., certain types of user device 210 may be permitted to output certain messages or types of messages). In some implementations, traffic security policy information may be global (e.g., may apply to all user devices 210 for which ASGW 220 analyzes traffic). Further, while some examples of traffic security policy information are discussed above, in practice, other types of traffic security policy information may be stored by traffic security policy component 315.

Traffic security policy component 315 may receive traffic security policy information from a user and/or from one or more external devices (e.g., application server 230). In some implementations, traffic security policy component 315 may automatically retrieve or receive traffic security policy information periodically and/or intermittently. For instance, traffic security policy component 315 may retrieve traffic security policy information from a particular application server specified by configuration information stored by gateway configuration component 305, at an interval specified by the configuration information.

Device security policy component 320 may store information regarding trusted and/or untrusted devices. For example, device security policy component 320 may store identifying information for one or more user devices (e.g., IP address, media access control ("MAC") address, device name, International Mobile Station Equipment Identity ("IMEI") number, and/or other identifying information), along with corresponding trust information. For instance, device security policy component 320 may store information indicating that a particular set of user devices 210 is trusted. Additionally, or alternatively, device security policy component 320 may store information indicating that a particular set of user devices 210 is not trusted.

A trusted device may correspond to a particular user device 210, which has received an IP address from router 215, and/or has been authenticated in some way. For example, an administrator may manually provide an indication that the particular user device 210 is a trusted device (e.g., via configuration information provided to gateway configuration component 305). Additionally, or alternatively, a user name and/or password may have been provided by user device 210, based on which device security policy component 320 may recognize user device 210 as a trusted device.

On the other hand, a trusted device may be a device that has not been authenticated, or whose authentication has been revoked. In some implementations, an untrusted device may be a device that has been granted an IP address by router 215. In some such implementations, identifying the device as an untrusted device may be a separate process from the handling of the device by router 215. For instance, even if device security policy component 320 recognizes a particular user device 210 as an untrusted device (or does not recognize the particular user device 210 as a trusted device), router 215 may still maintain an IP address for the particular user device 210. In this manner, router 215 may still send and receive traffic to and from the particular user device 210, but, as described below, ASGW 220 may enforce security policies that prevent some or all of the traffic sent to and/or from the particular user device 210 from being transmitted (e.g., to and/or from external network 225).

Such a technique may be useful, in that traffic associated with an untrusted user device 210 may be selectively (or completely) blocked, but ASGW 220 may still have the capability of communicating with the untrusted user device 210. By communicating with the untrusted user device 210, ASGW 220 may subsequently receive authentication information from the untrusted user device 210, in order to recognize user device 210 as a trusted device. Further, ASGW 220 may send alerts to user device 210, indicating that traffic sent to and/or from user device 210 has been blocked.

Traffic analysis component 325 may receive and/or analyze traffic, outputted by user devices 210, and may determine whether the traffic should be allowed to be forwarded to its intended destination, or whether remedial action (such as blocking the traffic, reporting the potential security threat, etc.) should be taken. Traffic analysis component 325 may make such a determination based on information received from, for example, device behavior component 310, traffic security policy component 315, and/or device security policy component 320.

When analyzing traffic, traffic analysis component 325 may analyze traffic header information, traffic payload information, or both. Traffic analysis component 325 may, for example, determine the type of traffic based on header information. For instance, traffic analysis component 325 may determine that traffic, which includes Simple Mail Transfer Protocol ("SMTP") header information, may be email traffic. As another example, traffic analysis component 325 may determine that traffic, associated with port 80, is web browsing traffic. As yet another example, traffic analysis component 325 may determine that traffic that includes video protocols or compression/decompression schemes ("codecs") is video traffic. Additionally, traffic analysis component 325 may determine (e.g., based on header information) a source and/or a destination of traffic.

In cases where traffic analysis component 325 determines that remedial action should be taken on traffic, remedial action component 330 may determine the type of remedial action to take, and/or may take the remedial action. In some implementations, remedial action component 330 may determine the type of remedial action based on the type of potential security threat identified by traffic analysis component 325. For example, if traffic analysis component 325 identifies that an unauthorized device is attempting to send traffic, remedial action component 330 may block the traffic that the unauthorized device is attempting to send. As another example, if traffic analysis component 325 identifies that a particular user device 210 is outputting an abnormal large amount of traffic, remedial action component 330 may allow the traffic, but output an alert (e.g., to user device 210, to an administrator, etc.). When determining the type of remedial action to take, remedial action component 330 may base the determination on configuration information provided by gateway configuration component 305.

Reporting component 335 may generate and/or output reports based on information received from device behavior component 310, traffic security policy component 315, device security policy component 320, traffic analysis component 325, and/or remedial action component 330. For instance, reporting component 335 may generate a report (e.g., a graphical and/or a textual report) that includes information regarding potential security threats that are identified by traffic analysis component 325. Additionally, or alternatively, reporting component 335 may generate a report with diagnostic information, which may indicate, on a per-user device basis, information such as amount of traffic sent and/or received, sources and/or destinations of traffic sent to and/or from user devices 210, types of traffic sent and/or received by user devices 210, etc.

Figure 4:
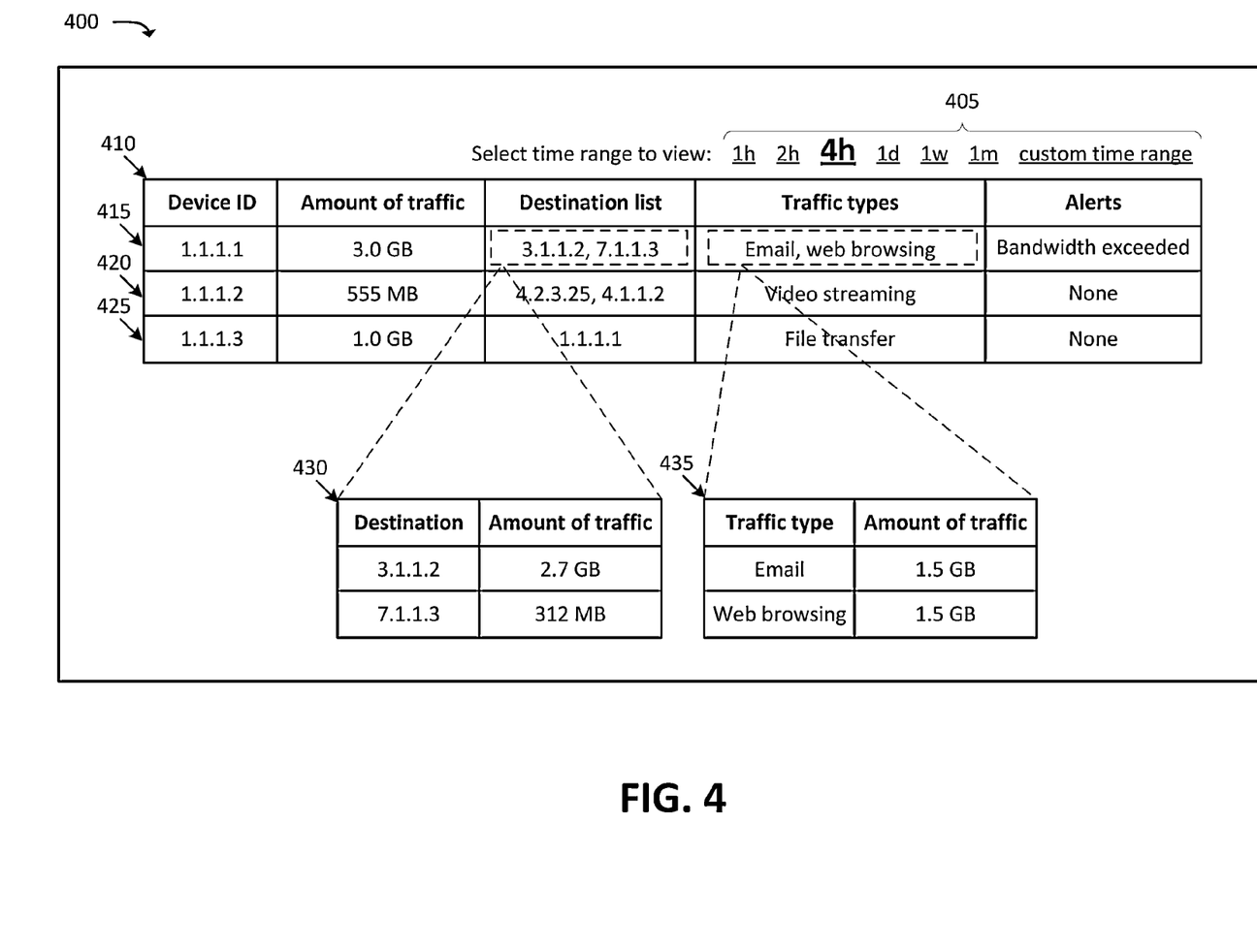
FIG. 4 illustrates an example user interface that may correspond to a report generated by an automated security gateway.

FIG. 4 illustrates an example user interface 400, which may correspond to a report provided by reporting component 335. In some implementations, user interface 400 may be presented by user device 210. For instance, depending on configuration information stored by gateway configuration component 305, reporting component 335 may provide user interface 400 to a particular user device 210 that corresponds to an administrator associated with ASGW 220. In some implementations, reporting component 335 may provide user interface 400 to one or more other user devices 210. For instance, in some such implementations, user interface 400 may include information regarding a particular user device 210, to which user interface 400 is provided, but not regarding other user devices 210 in local network 205.

As shown in FIG. 4, user interface 400 may include selectable options 405, may allow a user to specify a time range for which the user desires to view information. The illustrated selectable options 405 include options to view information for the previous hour, the previous two hours, the previous four hours, the previous day, the previous week, the previous month, or to select a custom time range. User interface may also include table 410, which may provide a summary view of network diagnostic information.

Example table 410, shown in FIG. 4, may include information regarding three user devices 210, each of which corresponds to one of rows 415-425. The information, for each particular user device 210, may include, for example, a device identifier ("Device ID"), an amount of traffic, a destination list, a list of traffic types, and alerts associated with the particular user device 210. The device identifier field may include identifying information for a user device, such as an IP address, an IMEI number, a MAC address, a device name, and/or another identifier.

The field indicating the amount of traffic may include information indicating how much traffic has been sent and/or received by the particular user device 210 during the selected time period. This field may include a value indicating an amount of traffic received by user device 210, an amount of traffic sent by user device 210, and/or an aggregate value that represents a total amount of traffic sent and received by user device 210 during the selected time period.

The field indicating the list of destinations of traffic for a particular user device 210 may include a list (e.g., a variable size list, such as a linked list) of destinations to which user device 210 has outputted (or attempted to output) traffic. The destinations may be represented as, for instance, IP addresses, Uniform Resource Locators ("URLs"), Uniform Resource Indicators ("URIs"), and/or one or more other identifiers. Although shown in the figure as a list of destinations, table 410 may additionally, or alternatively, include a list of devices from which user device 210 receives traffic.

The field indicating the types of traffic outputted by a particular user device 210 may include identifiers of different traffic types of traffic outputted by user device 210 during the selected time period. This field may include a list of type identifiers, such as names of types of traffic (e.g., email, web browsing, video streaming, file transfer, etc.). In some implementations, table 410 may additionally, or alternatively, include identifiers of types of traffic received by user device 210.

The field indicating alerts associated with a particular user device 210 may include information regarding potential security threats identified by traffic analysis component 325 during the selected time period. This field may include, for instance, an indication of the type of security threat. For example, as shown in row 415, a "bandwidth exceeded" alert may have been generated for user device 210, having the device identifier of 1.1.1.1.

As further shown in FIG. 4, user interface 400 may include the capability of generating more detailed reports, such as those shown in example tables 430 and 435. These reports may allow a user to further examine network data in a more granular fashion, by correlating certain types of network information to other types of network information in a more specific way than shown in table 410. For instance, table 430 may display amounts of data sent and/or received to and/or from particular destinations, and table 435 may display amounts of data sent and/or received that correspond to particular types of traffic. While tables 430 and 435 illustrate some examples of specific data that may be presented, in practice, other representations and correlations are possible.

Figure 5:
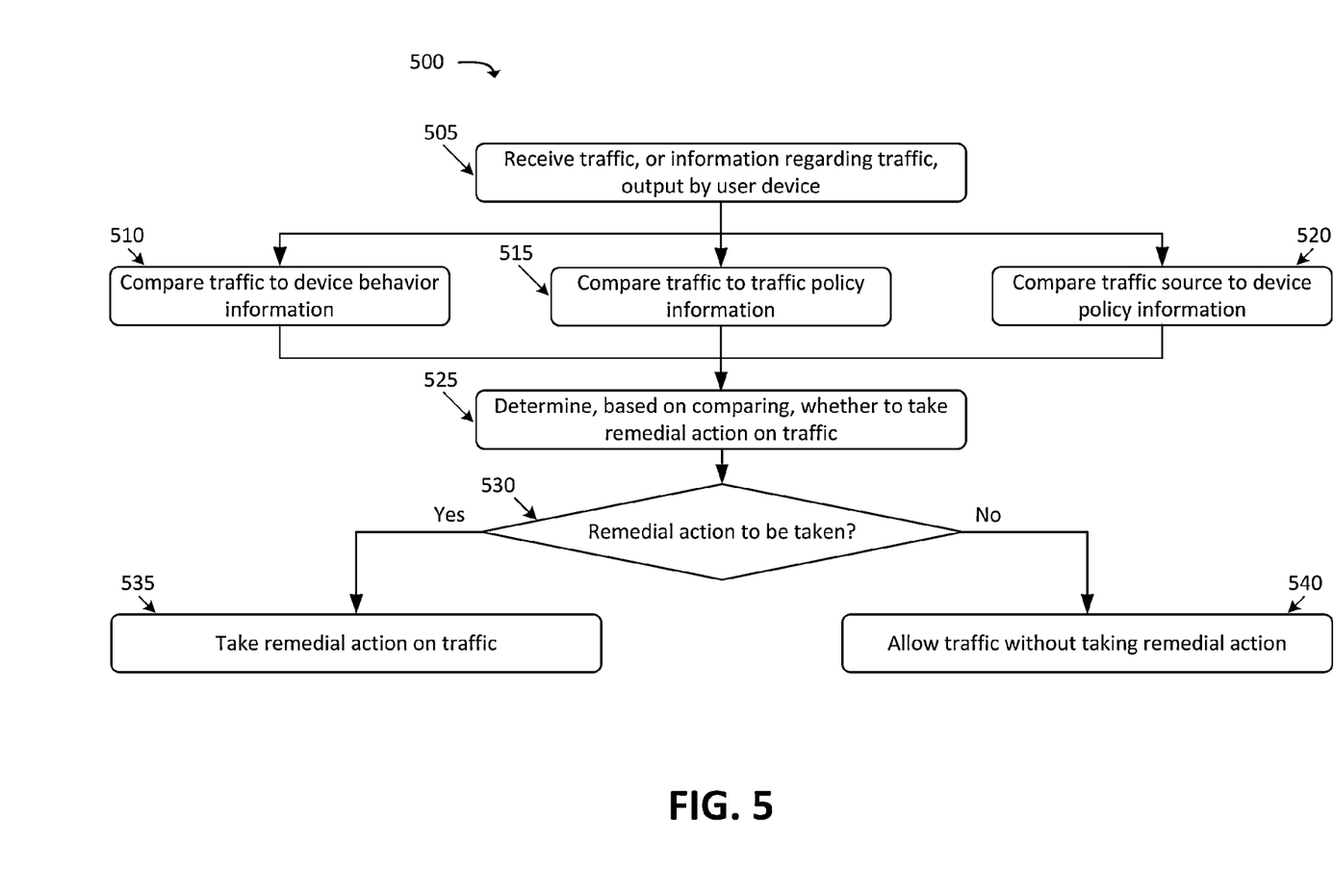
FIG. 5 illustrates an example process for detecting and remedying a potential security threat.

FIG. 5 illustrates an example process 500 for detecting and remedying a potential security threat. In one example implementation, process 500 may be performed by ASGW 220. For example, some or all of process 500 may be performed by the various components described above with respect to FIG. 3. In some implementations, some or all of process 500 may be performed by one or more other devices in lieu of, or in conjunction with, ASGW 220.

Process 500 may include receiving traffic, or information regarding traffic, outputted by a user device (block 505). For example, as described above with respect to traffic analysis component 325, ASGW 220 may receive traffic (and/or information regarding traffic) outputted by one or more user devices 210. As also described above with respect to traffic analysis component 325, ASGW 220 may analyze the traffic to determine, for example, an identifier of the source of the traffic (e.g., an IP address, device name, or other identifier of user device 210), an identifier of the intended destination of the traffic, a type of the traffic, etc.

Process 500 may also include comparing the traffic to device behavior information (block 510). For example, as described above with respect to device behavior component 310 and traffic analysis component 325, ASGW 220 may determine whether the traffic falls outside of an ordinary trend of traffic associated with user device 210. For instance, assume that user device 210 typically sends, on average, 20 emails in one day. Further assume that based on the traffic received at block 505, ASGW 220 determines that user device 210 is attempting to send 1,000 emails in one day. In this case, ASGW 220 may determine that the present traffic pattern does not match the previously measured device behavior.

Process 500 may further include comparing the traffic to traffic policy information (block 515). For instance, as described above with respect to traffic security policy component 315, the traffic policy information may, for instance, indicate trusted or untrusted destinations for the traffic (e.g., "phishing" web sites may be untrusted destinations). As another example, the traffic policy information may indicate authorized and/or unauthorized content or types of messages that may be sent by particular user devices 210 or types of user devices 210. As yet another example, and as also described above with respect to traffic security policy component 315, the traffic policy information may indicate whether device-to-device communications are permitted (e.g., on a per-device basis, or on a network-wide basis). As described above with respect to traffic analysis component 325, ASGW 220 may compare traffic information (e.g., header and/or payload information) to the traffic policy information in order to determine whether the traffic is associated with any potential security threats.

Process 500 may additionally include comparing the traffic source to device policy information (block 520). For example, as described above with respect to device security policy component 320, device policy information may indicate a set of devices that are trusted and/or a set of devices that are untrusted. As described above with respect tot traffic analysis component 325, ASGW 220 may, at block 520, compare traffic source and/or destination information (e.g., as indicated in header information) to the device security policy information, in order to determine whether the traffic is permissible, based on an identity of the sender and/or receiver of the traffic.

Process 500 may determine, based on the comparing, whether to take remedial action on the traffic (block 525). For instance, as described above with respect to traffic analysis component 325, based on the comparing performed at one or more of blocks 510-520, ASGW 220 may determine whether to take remedial action. For instance, if traffic analysis component 325 identifies that a bandwidth limit was exceeded by a particular user device 210, traffic analysis component 325 may determine that remedial action should be taken. As another example, if traffic analysis component 325 identifies that a particular user device 210 (e.g., a temperature sensor) is outputting unauthorized traffic (e.g., traffic that is unrelated to temperature sensor functionality, and/or traffic to a destination that is not an authorized destination for temperature sensor information, etc.), then traffic analysis component 325 may determine that remedial action should be taken.

If remedial action is to be taken (block 530—YES), then process 500 may include taking remedial action on the traffic (block 535). For example, as described above with respect to remedial action component 330, ASGW 220 may block the traffic, outputted from user device 210 and received at block 505, from being forwarded to its intended destination. Additionally, or alternatively, ASGW 220 may output an alert to user device 210 and/or another device (e.g., a device associated with an administrator), indicating that a potential security threat has been identified.

If, on the other hand, remedial action is not to be taken (block 530—NO), then process 500 may include allowing the traffic, without taking remedial action (block 540). For instance, ASGW 220 may forward the traffic (received at block 505) to its intended destination, may output an indication that the traffic should be forwarded, and/or may forgo outputting an indication that the traffic should be blocked.

Figure 6:
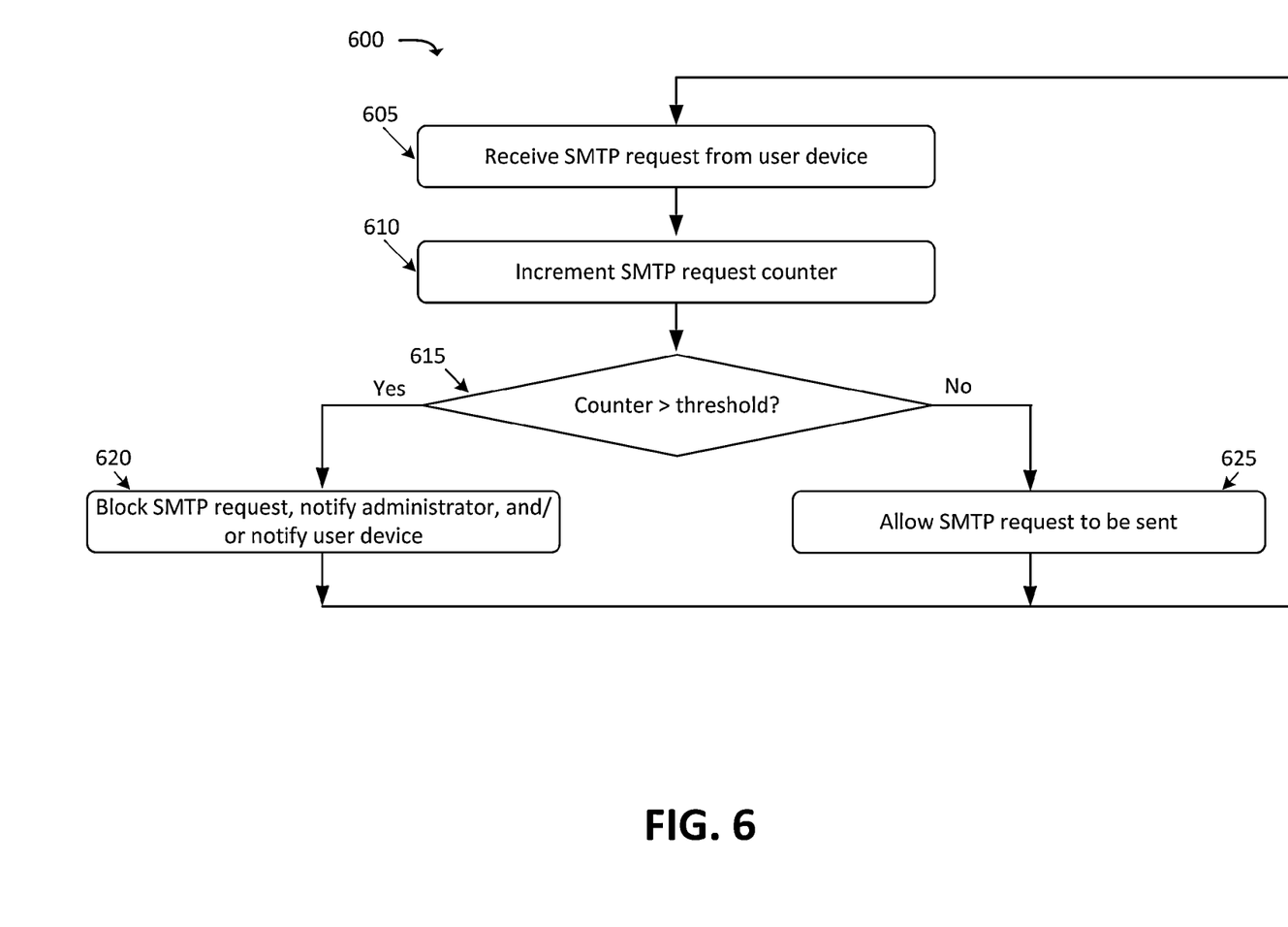
FIG. 6 illustrates another example process for detecting and remedying a potential security threat.

FIG. 6 illustrates another example process 600 for detecting and remedying a potential security threat. Process 600 may correspond to an implementation of a portion of process 500, in which ASGW 220 may identify whether a particular user device 210 is sending, or is attempting to send, an excessive quantity of emails (or email requests). In one implementation, ASGW 220 may perform process 600, while in some implementations, one or more other devices may perform some or all of process 600 in addition to, or in lieu of, ASGW 220.

Process 600 may include receiving an SMTP request from a user device (block 605). The SMTP request may be, for example, a synchronize ("SYN") message that is a part of a three-way SMTP handshake, which may be an initial step in sending an email. ASGW 220 may, for example, examine header information of one or more data packets received from a particular user device 210.

Process 600 may further include incrementing an SMTP request counter associated with the user device (block 610). For instance, ASGW 220 (e.g., traffic analysis component 325) may maintain a counter that tracks how many SMTP requests have been received from user device 210. This counter may be maintained on a per-device basis, such that different user devices 210 in local network 205 are each associated with their own respective SMTP request counters. In some implementations, the counter may have an initial value of 0, and may be incremented (at block 610) each time an SMTP request is received from the corresponding user device 210. The counter may be maintained in such a way that excessive SMTP requests, over a particular duration of time, may be identified. For example, the counter may be reset periodically (e.g., every 24 hours, every week, etc.), may be decremented periodically (e.g., every 15 minutes, every hour, etc.), or may be reduced or reset in another way (e.g., decremented 15 minutes after being incremented). In this sense, the counter may indicate a rate, over a particular period of time, at which SMTP requests are being received from user device 210.

Process 600 may also include determining whether the value of the counter has exceeded a threshold value (block 615). The threshold value may be based on, for instance, device behavior information stored by device behavior component 310. For instance, the device behavior information may indicate an average rate (e.g., an average quantity of emails in a time period that is relevant to the counter) at which user device 210 typically sends emails. In some implementations, the threshold value may be based on the average rate. For instance, the threshold value may equal the average rate, multiplied by a particular duration of time associated with the counter. In some implementations, the threshold value may be based on the average rate, increased by a particular margin (e.g., 30%, 50%, or 100% greater than a value that is based purely on the average rate). In this sense, a greater than average amount of SMTP requests may be considered as allowable, but a significant deviation from the average may be identified as a potential security threat.

In some implementations, the threshold value may be based on one or more factors, independent of user device behavior. For example, an administrator may manually indicate a threshold value, or a maximum rate based on which the threshold value may be calculated.

If the counter exceeds the threshold value (block 615—YES), then process 600 may include taking remedial action, such as blocking the SMTP request, notifying an administrator, and/or notifying user device 210. In some implementations, ASGW 220 may subsequently receive an override command, based on which ASGW 220 may temporarily increase the threshold value, and/or may temporarily allow SMTP requests even if the counter value exceeds the threshold. For example, an administrator may indicate that the increased amount of email requests is expected.

If, on the other hand, the counter does not exceed the threshold value (block 615—NO), then process 600 may include allowing the SMTP request to be sent. For example, ASGW 220 may forward the SMTP request to a destination indicated in the SMTP request (e.g., an SMTP mail server).

While process 600 is described in the context of an SMTP request, similar techniques may be applied to other types of traffic, and/or based on other types of analysis. For example, similar techniques may be applied to web browsing traffic, video traffic, etc. Furthermore, similar techniques may be applied in order to determine whether a threshold quantity of data has been sent and/or received by a particular user device 210.

Figure 7:
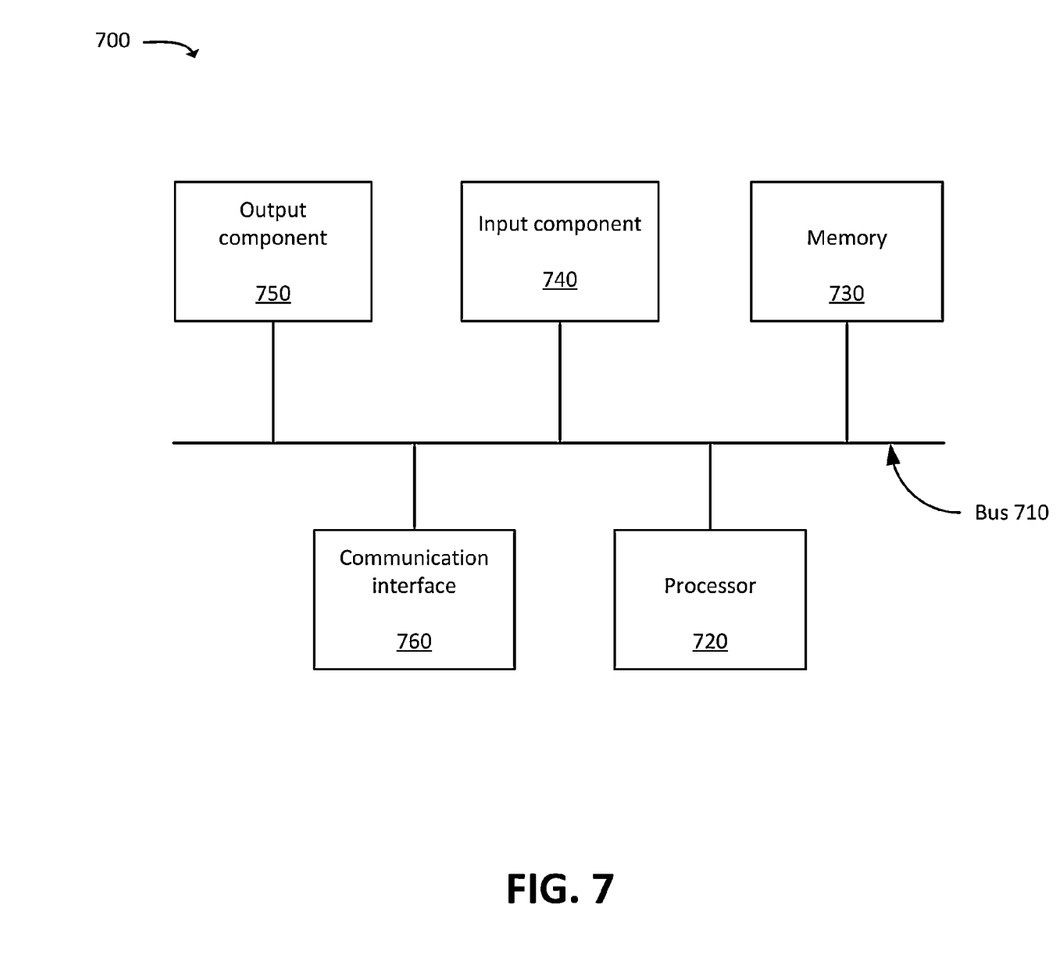
FIG. 7 illustrates example components of one or more devices, according to one or more implementations described herein.

FIG. 7 is a diagram of example components of device 700. One or more of the devices described above (e.g., with respect to FIGS. 1A-1E, 2, and 3) may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 5 and 6, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 2 and 3), in practice, additional, fewer, or different, connections or devices may be used. For example, while a direct connection is not shown, in FIG. 2, between user devices 210 and ASGW 220, in some implementations, ASGW 220 may communicate either directly with one or more user devices 210 (e.g., not via router 215). Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
   receiving, by a network security device and from a router, over a first period of time, traffic that has been outputted by a particular user device, the traffic including a first set of emails;
   receiving, by the network security device, device policy information regarding trusted devices;
   determining that the device policy information does not indicate that an intended recipient of the traffic is a trusted device;
   comparing, by the network security device, information regarding the received traffic to device behavior information, the behavior information including an average quantity of emails outputted by the particular user device over a second period of time, the comparing including comparing a quantity of emails, in the first set of emails outputted by the particular user device over the first period of time, to the average quantity of emails outputted by the particular user device over a second period of time;

determining, by the network security device, that a security threat exists with regard to the traffic, the determining that the security threat exists including determining, based on the comparing, that the quantity of emails, in the first set of emails, is greater than the average quantity of emails outputted by the particular user device over the second period of time, wherein determining that the security threat exists is further based on determining that the device policy information does not indicate that the intended recipient of the traffic is a trusted device;

taking, by the network security device and based on determining that the security threat exists, remedial action with respect to the traffic received over the first period of time, wherein taking the remedial action includes preventing the traffic from being forwarded to an intended destination associated with the traffic;

receiving, by the network security device and from the router, over a third period of time, a second set of emails that have been outputted by the particular user device, wherein the second period of time occurs after the first period of time, and wherein the third period of time occurs after the second period of time;

comparing, by the network security device, a quantity of emails, in the second set of emails, to the quantity of emails in the first set of emails;

determining, by the network security device and based on the comparing the quantity of emails in the second set of emails to the quantity of emails in the first set of emails, that the quantity of emails in the second set of emails is greater than the quantity of emails in the first set of emails; and taking, by the network security device and based on determining that the quantity of emails in the second set of emails is greater than the quantity of emails in the first set of emails, remedial action with respect to the second set of emails.

2. The method of claim 1, further comprising:
receiving traffic previously outputted from the particular user device,
wherein the device behavior information is based on the traffic previously outputted from the particular user device.

3. The method of claim 1, wherein the information regarding the device behavior information further includes information regarding a type of traffic previously outputted by the particular user device;
wherein comparing the information regarding the traffic to the device behavior information further includes:
identifying a type associated with the information regarding the traffic outputted by the particular user device; and
comparing the type, associated with the information regarding the traffic outputted by the particular user device, to the type of traffic previously outputted by the particular user device.

4. The method of claim 1, wherein at least a portion of the device behavior information is provided to the network security device by a device that is external to a local network associated with the network security device.

5. The method of claim 1, further comprising:
receiving traffic policy information regarding inter-device communications,
wherein the traffic policy information regarding inter-device communications specifies one or more devices to which the particular user device is not permitted to output traffic; and
determining that an intended destination of the traffic is a particular one of the one or more devices to which the particular user device is not permitted to output traffic,
wherein determining that the security threat exists is further based on determining that the intended destination of the traffic is the particular one of the one or more devices to which the particular user device is not permitted to output traffic.

6. The method of claim 1, further comprising:
determining that the device policy information does not indicate that the particular user device is a trusted device,
wherein determining that the security threat exists is further based on determining that the device policy information does not indicate that the particular user device is a trusted device.

7. The method of claim 6, wherein taking the remedial action does not include modifying or removing an Internet protocol ("IP") address, associated with the particular user device, by the router.

8. The method of claim 1, further comprising:
receiving traffic policy information regarding a maximum amount of traffic permitted from the particular user device during a particular period of time; and
determining that an amount of traffic, outputted by the device during the first period of time, meets or exceeds the maximum amount of traffic permitted from the particular user device,
wherein determining that the security threat exists is further based on determining that the amount of traffic, outputted by the device during the first period of time, meets or exceeds the maximum amount of traffic permitted from the particular user device.

9. The method of claim 8, wherein the policy information regarding the maximum amount of traffic permitted from the particular user device during the particular period of time includes:
information indicating a predetermined maximum quantity of email requests permitted from the particular user device during the particular period of time,
wherein determining that a quantity of email requests, outputted by the device during the first period of time, meets or exceeds the maximum quantity of email requests permitted from the particular user device.

10. A network security device, comprising:
a memory device storing a set of computer-executable instructions; and
one or more processors configured to execute the computer-executable instructions, wherein executing the computer-executable instructions causes the one or more processors to:
receive information regarding traffic that has been outputted by a particular user device over a first period of time, the traffic including a first set of emails;

receive device policy information regarding a plurality of trusted devices;
determine that the device policy information does not indicate that an intended recipient of the traffic is a trusted device, of the plurality of trusted devices;
compare the information regarding the traffic to device behavior information,
the behavior information including an average quantity of emails outputted by the particular user device over a second period of time;
determine that a security threat exists with regard to the traffic, the determination including:
comparing a quantity of emails, in the first set of emails outputted by the particular user device over the first period of time, to the average quantity of emails outputted by the particular user device over a second period of time,
wherein the determination that the security threat exists is further based on determining that the device policy information does not indicate that the intended recipient of the traffic is a trusted device, of the plurality of trusted devices;
take, based on determining that the security threat exists, remedial action with respect to the traffic, wherein executing the computer-executable instructions to take the remedial action causes the one or more processors to prevent the traffic from being forwarded to an intended destination associated with the traffic;
receive, over a third period of time, information regarding a second set of emails that have been outputted by the particular user device,
wherein the second period of time occurs after the first period of time, and wherein the third period of time occurs after the second period of time;
compare a quantity of emails, in the second set of emails, to the quantity of emails in the first set of emails;
determine, based on the comparing the quantity of emails in the second set of emails to the quantity of emails in the first set of emails, that the quantity of emails in the second set of emails is greater than the quantity of emails in the first set of emails; and
taking, by the network security device and based on determining that the quantity of emails in the second set of emails is greater than the quantity of emails in the first set of emails, remedial action with respect to the second set of emails.

11. The network security device of claim 10, wherein executing the computer-executable instructions further causes the one or more processors to:
receive traffic previously outputted from the particular user device,
wherein the device behavior information is based on the traffic previously outputted from the particular user device.

12. The network security device of claim 10, wherein the information regarding the device behavior information includes information regarding a type of traffic previously outputted by the particular user device;
wherein executing the computer-executable instructions, to compare the information regarding the traffic to the device behavior information, further causes the one or more processors to:
identify a type associated with the information regarding the traffic outputted by the particular user device; and
compare the type, associated with the information regarding the traffic outputted by the particular user device, to the type, average quantity, or average rate of traffic previously outputted by the particular user device.

13. The network security device of claim 10, wherein at least a portion of the device behavior information is provided to the network security device by a device that is external to a local network associated with the network security device.

14. The network security device of claim 10, wherein executing the computer-executable instructions further causes the one or more processors to:
receive traffic policy information regarding inter-device communications,
wherein the traffic policy information regarding inter-device communications specifies one or more devices to which the particular user device is not permitted to output traffic; and
determine that the intended destination of the traffic is a particular one of the one or more devices to which the particular user device is not permitted to output traffic,
wherein determining that the security threat exists is further based on determining that the intended destination of the traffic is the particular one of the one or more devices to which the particular user device is not permitted to output traffic.

15. The network security device of claim 10, wherein executing the computer-executable instructions, to take the remedial action, does not include modifying or removing an Internet Protocol ("IP") address, associated with the particular user device, by a router that is communicatively coupled to the particular user device and an external network.

16. The network security device of claim 10, wherein executing the computer-executable instructions further causes the one or more processors to:
receive traffic policy information includes policy information regarding a maximum amount of traffic permitted from the particular user device during a particular period of time; and
determine that an amount of traffic, outputted by the device during the first period of time, meets or exceeds the maximum amount of traffic permitted from the particular user device,
wherein determining that the security threat exists is further based on determining that the amount of traffic, outputted by the device during the first period of time, meets or exceeds the maximum amount of traffic permitted from the particular user device.

17. The network security device of claim 16, wherein the policy information regarding the maximum amount of traffic permitted from the particular user device during the particular period of time includes:
information indicating a predetermined maximum quantity of email requests permitted from the particular user device during the particular period of time,
wherein determining that a quantity of email requests, outputted by the device during the first period of time, meets or exceeds the maximum quantity of email requests permitted from the particular user device.

18. A method, comprising:
receiving, by a network security device, a set of security configurations from a service provider, the set of security configurations including an indication of one or more trusted devices;
determining, by the network security device, behavior information for a particular user device that is communicatively coupled to the network security device, the behavior information being determined based on traffic outputted by the user device over time,
wherein the behavior information indicates patterns of traffic sent by the particular user device,
the patterns including an average quantity of emails sent by the particular user device over a first period of time;
receiving, by the network security device and over a second period of time, particular traffic outputted by the particular user device, the particular traffic including a first set of emails;
comparing, by the network security device, the particular traffic to the behavior information, the comparing including:
comparing a quantity of emails, in the first set of emails outputted over the second period of time, to the average quantity of emails sent by the particular user device over the first period of time;
determining, by the network security device, an intended recipient of the particular traffic;
determining, by the network security device, and based on the set of security configurations, whether the intended recipient of the particular traffic is a particular trusted device, of the one or more trusted devices;
determining, by the network security device, based on the set of security configurations, and based on comparing the particular traffic to the behavior information, whether a security threat exists with regard to the particular traffic, the determining including:
determining whether the quantity of emails, outputted over the second period of time, is greater than the average quantity of emails sent by the particular user device over the first period of time, and
determining whether the intended recipient of the particular traffic is not a particular trusted device, of the one or more trusted devices;
taking, by the network security device and when determining that the security threat exists, remedial action with regard to the particular traffic, the remedial action including forgoing forwarding the particular traffic toward the intended recipient of the particular traffic;
receiving, by the network security device and over a third period of time, a second set of emails that were outputted by the particular user device,
wherein the second period of time occurs after the first period of time, and
wherein the third period of time occurs after the second period of time;
comparing, by the network security device, a quantity of emails, in the second set of emails, to the quantity of emails in the first set of emails outputted by the particular user device over the second period of time;
determining, by the network security device and based on the comparing the quantity of emails in the second set of emails to the quantity of emails in the first set of emails, that the quantity of emails in the second set of emails is greater than the quantity of emails in the first set of emails; and
taking, by the network security device and based on determining that the quantity of emails in the second set of emails is greater than the quantity of emails in the first set of emails, remedial action with respect to the second set of emails.

19. The method of claim 18, further comprising:
generating an alert regarding to the particular traffic, the alert including payload information associated with the particular traffic.

20. The method of claim 18, wherein the device behavior information is based on traffic previously outputted from the particular user device.

* * * * *